US011934163B2

(12) United States Patent
Sugumar et al.

(10) Patent No.: US 11,934,163 B2
(45) Date of Patent: Mar. 19, 2024

(54) METHOD AND SYSTEM FOR RETRIEVING BUILDING AUTOMATION SYSTEM CONTROLLER INFORMATION USING NEAR FIELD COMMUNICATION

(71) Applicant: Carrier Corporation, Palm Beach Gardens, FL (US)

(72) Inventors: Mohan Sugumar, Tamilnadu (IN); Jaiprakash Bv, Karnataka (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 439 days.

(21) Appl. No.: 17/126,663

(22) Filed: Dec. 18, 2020

(65) Prior Publication Data

US 2022/0035327 A1 Feb. 3, 2022

(30) Foreign Application Priority Data

Jul. 30, 2020 (IN) .............................. 202011032700

(51) Int. Cl.
*G05B 19/042* (2006.01)
*G06K 7/10* (2006.01)
*G10L 15/22* (2006.01)
*H04W 4/80* (2018.01)

(52) U.S. Cl.
CPC ....... *G05B 19/042* (2013.01); *G06K 7/10297* (2013.01); *H04W 4/80* (2018.02); *G05B 2219/25011* (2013.01); *G10L 15/22* (2013.01); *G10L 2015/223* (2013.01)

(58) Field of Classification Search
None
See application file for complete search history.

(56) References Cited

U.S. PATENT DOCUMENTS

| 7,917,232 | B2 | 3/2011 | McCoy et al. |
| 8,010,999 | B2 | 8/2011 | Fujita et al. |
| 8,144,012 | B2 | 3/2012 | Fujita et al. |
| 8,498,572 | B1 | 7/2013 | Schooley et al. |
| 8,701,979 | B2 | 4/2014 | Yokota et al. |

(Continued)

FOREIGN PATENT DOCUMENTS

| KR | 20160025806 A | * | 3/2016 | ............. G05B 15/02 |
| WO | WO-2016154326 A1 | * | 9/2016 | ............. G05B 15/02 |

OTHER PUBLICATIONS

"NFC for embedded applications—Your critical link for the Internet of Things", Document No. 9397 750 17587, 20 pages, Aug. 2014.

(Continued)

*Primary Examiner* — Jae U Jeon
(74) *Attorney, Agent, or Firm* — Kinney & Lange, P.A.

(57) ABSTRACT

A process for retrieving configuration information for a controller of a building automation system (BAS) includes verifying login information on a mobile computing device to ensure the mobile computing device has authority to access a wiring diagram. Then, a mobile computing device receives identity information associated with the controller via Near Field Communication (NFC) read operations from memory of an NFC tag associated with the controller and retrieves, using the identity information, the wiring diagram from a storage medium. The mobile computing device further displays the retrieved wiring diagram associated with the controller.

21 Claims, 3 Drawing Sheets

(56) References Cited

U.S. PATENT DOCUMENTS

| | | | |
|---|---|---|---|
| 9,111,466 | B2 | 8/2015 | Dor et al. |
| 9,451,389 | B2 | 9/2016 | Beg et al. |
| 9,602,301 | B2 * | 3/2017 | Averitt .................. H04L 67/125 |
| 10,261,530 | B2 | 4/2019 | Schmidlin et al. |
| 10,355,919 | B2 | 7/2019 | Hulquest et al. |
| 10,458,669 | B2 | 10/2019 | Ribbich et al. |
| 10,475,298 | B1 | 11/2019 | Werner et al. |
| 10,581,199 | B2 | 3/2020 | Werner et al. |
| 10,621,527 | B2 | 4/2020 | Tiwari et al. |
| 2016/0231372 | A1 * | 8/2016 | Wootton ............. H04L 12/2809 |
| 2017/0053441 | A1 | 2/2017 | Nadumane et al. |
| 2017/0082993 | A1 * | 3/2017 | Narain .................... H04W 4/33 |
| 2019/0340399 | A1 | 11/2019 | Werner et al. |
| 2020/0226223 | A1 * | 7/2020 | Reichl ..................... G06F 30/18 |

OTHER PUBLICATIONS

"NXP Smart home NFC commissioning solution"—Public—MobileKnowledge, 41 pages, Oct. 2015.

"Honeywell Home from Resideo Helps Your Home Stay 'Just Right'"—Set, Forget and Save—from <https://towerequipmentco.com/category/new-technology/>, 33 pages, Apr. 29, 2019.

* cited by examiner

METHOD AND SYSTEM FOR RETRIEVING BUILDING AUTOMATION SYSTEM CONTROLLER INFORMATION USING NEAR FIELD COMMUNICATION

FIELD OF THE INVENTION

The present disclosure relates generally to building automation systems (BAS) and, more specifically, to the retrieval of configuration information, such as wiring diagrams and cable tags, for BAS controllers using Near Field Communication (NFC) techniques.

BACKGROUND

Building automation systems (BAS) are used to manage and automate the control of various environmental, physical, and electrical building subsystems. In particular, BAS systems are often used for the coordination and control of heating, ventilation and air conditioning (HVAC) and climate control systems, but are also frequently used for security systems, lighting systems, and other connected building subsystems.

BAS systems typically leverage a series of interconnected controller devices that coordinate the control and automation of such subsystems. Large-scale BAS systems can include hundreds, or even thousands, of controllers.

Configuration and commissioning of the BAS controllers, however, typically requires a team of service engineers to physically connect with each BAS controller (e.g., using a wired Ethernet or other wired connection) via a laptop or another computing device to initialize each BAS controller with, for example, wireless communication parameters and numerous other configuration parameters that define communicative and other operational characteristics of the controllers. Configuration and commissioning also require connecting numerous wires/cables to each BAS controller and labeling those wires/cables. Accordingly, conventional techniques for configuring and commissioning BAS controllers for operation often require a significant outlay of service engineering and/or technician resources, thereby increasing the time and expense associated with the installation and maintenance of BAS systems.

SUMMARY

In one example, a process for retrieving configuration information for a controller of a building automation system (BAS) includes verifying login information on a mobile computing device to ensure the mobile computing device has authority to access a wiring diagram. Then, a mobile computing device receives identity information associated with the controller via Near Field Communication (NFC) read operations from memory of an NFC tag associated with the controller and retrieves, using the identity information, the wiring diagram from a storage medium. The mobile computing device further displays the retrieved wiring diagram associated with the controller.

In another example, a system for retrieving configuration information for a controller includes a Near Field Communication (NFC) tag including NFC memory that stores identity information corresponding to the controller; a storage medium configured to store electronic (i.e., digital) data; and a mobile computing device that includes an NFC transceiver and is configured to receive the identity information from the NFC tag and retrieve a wiring diagram associated with the controller from the storage medium.

DETAILED DESCRIPTION

Methods and systems are disclosed herein for retrieving configuration information; such as wiring diagrams, cable tags, manual instructions, and/or building floorplans; for a building automation system (BAS) controller via a mobile computing device utilized by a service engineer or other technician. The configuration information can be stored in a variety of locations for later retrieval (and revision) by the mobile computing device, such as in the memory of a Near Field Communication (NFC) tag associated with the BAS controller, in the memory of the mobile computing device, and/or in a storage medium remote from the mobile computing device and the NFC tag.

The methods and systems described herein provide for secure and reliable NFC communications between the mobile computing device and the BAS controller, as well as the ability to verify that the mobile computing device has the authority to access the configuration information based on identity information associated with the BAS controller that is stored in the memory of the NFC tag. Moreover, the use of passive NFC tag technologies enables the identity and configuration information to be determined and stored in the memory of the NFC tag while the BAS controller is in a powered-off state, thereby increasing flexibility of scheduling for commissioning/installation operations associated with the controller. With the configuration information including the wiring diagram for instruction on connecting cables to the BAS controller and the cable tags for labeling the cables that are being connected to the BAS controller, only one service engineer/technician is needed to perform both the wiring and tagging, therefore decreasing the time and corresponding cost associated with configuring and commissioning of the BAS controllers. Further, the mobile computing device allows for revisions to the wiring diagram and cable tags (and other configuration information, such as the manual instruction and floorplan). The mobile computing device allows for storage of the revised wiring diagram and/or cable tags on any of the storage media with the revised wiring diagram and/or cable tags being retrievable by being identified with the previous identity information or new, updated identity information stored in the memory of the NFC tag.

Figure 1:
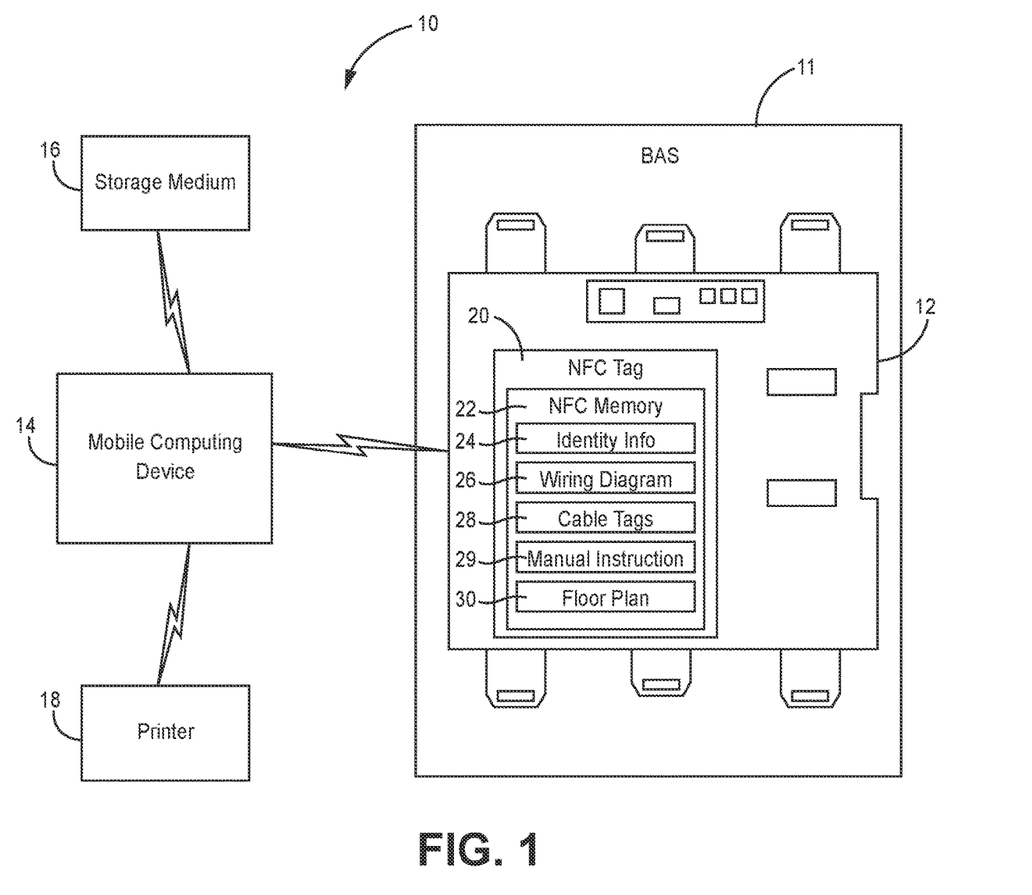
FIG. 1 is a block diagram illustrating an example system including a building automation system (BAS) controller having a Near Field Communication (NFC) tag and a mobile computing device that communicates with the NFC tag.

FIG. 1 is a block diagram illustrating an example system 10 that includes building automation system (BAS) 11, BAS controller 12, mobile computing device 14, storage medium 16, and printer 18. As illustrated in FIG. 1, BAS controller 12 includes NFC tag 20 associated therewith. For instance, NFC tag 20 can be integrated with computer-readable memory of BAS controller 12, attached to BAS controller 12 (e.g., adhesively or otherwise attached to an interior or exterior of a housing of BAS controller 12), or otherwise associated with BAS controller 12. As further illustrated in FIG. 1, NFC tag 20 includes NFC memory 22 that stores identity information 24, wiring diagram 26, cable tags 28, manual instruction 29, and/or floorplan 30.

BAS 11 is used to manage and automate the control of various environmental, physical, and electrical building systems of a building in which BAS 11 is located. In particular, BAS 11 can be used for the coordination and control of heating, ventilation, and air conditioning (HVAC) and climate control systems. Additionally, BAS 11 can be used for security systems, lighting systems, and other connected building subsystems. BAS 11 utilizes multiple interconnected BAS controllers 12 to coordinate the control and automation of various building subsystems. The number of BAS controllers 12 in BAS 11 can be as little as one or two or as many as thousands.

BAS controller 12 can be one of a plurality of BAS controllers, each electrically and/or communicatively coupled with one or more BAS 11 subsystems and/or components (not illustrated), such as heating, ventilation and air conditioning (HVAC) components, security system components, lighting system components, or other building subsystems and/or components. As such, though the example of FIG. 1 is illustrated and described with respect to a single BAS controller (i.e., BAS controller 12 in this example), it should be understood that the techniques described herein are applicable to a system that includes multiple BAS controllers, such as tens, hundreds, thousands, or other numbers of BAS controllers.

NFC tag 20, associated with BAS controller 12, includes radio frequency (RF) antenna and other circuitry (not illustrated) for communicating via NFC read and write operations with a NFC transceiver within range, such as a range of 20 centimeters (7.87 inches) or less. NFC tag 20 can be a passive NFC tag that draws power via magnetic induction from an active device within range, such as via an NFC signal produced by an NFC transceiver of mobile computing device 14. As such, as is further described below, NFC tag 20 can enable the transfer of data between NFC memory 22 and an NFC transceiver of mobile computing device 14 even when BAS controller 12 is in a powered-off state.

Mobile computing device 14, as illustrated in FIG. 1, is remote from (i.e., physically remote from) BAS controller 12, and includes an NFC transceiver that communicates wirelessly with BAS controller 12 for retrieving and storing configuration information (such as wiring diagram 26, cable tags 28, manual instruction 29, and floorplan 30) corresponding to BAS controller 12 within NFC memory 22. Examples of mobile computing device 14 can include, but are not limited to, a portable or mobile device such as a laptop computer, a tablet computer, a smartphone, a personal digital assistant (PDA), or other mobile computing device that includes at least one NFC transceiver capable of communicating via NFC read and write operations with NFC tag 20. While described as a mobile device, mobile computing device 14 can be a nonmobile device such as a desktop computer that is able to communicate with NFC tag 20 via NFC read and write operations.

In operation, identity information 24 corresponding to BAS controller 12 is stored in NFC memory 22 during, for example, manufacturing or other pre-commissioning activities. For instance, identity information 24 can be stored in NFC memory 22 by BAS controller 12, such as via an NFC transceiver of BAS controller 12, or via an NFC transceiver of a remote device, such as a smartphone, laptop computer, tablet computer, or other NFC programmer at a manufacturing or other production facility. Identity information 24 can include, for example, any one or more of a media access control (MAC) address of BAS controller 12, a MAC address of a wireless transceiver of BAS controller 12, a model type of BAS controller 12, an internet protocol (IP) address, a building automation control network (BACnet) MAC address, a hardware address, a vendor identification number, a device identification number, a serial number (e.g., a unique serial number) of BAS controller 12, a serial number of NFC tag 20, a device/BAS controller 12 location, a firmware or other software version number associated with BAS controller 12, or other identity information associated with BAS controller 12. In some examples, such as the example of FIG. 1, configuration information can also be stored in NFC memory 22, such as via a NFC transceiver of BAS controller 12 or a remote computing device during the manufacturing or other pre-commissioning activities. Identity information 24 provides some security to system 10, as the configuration information may not be accessed when stored on mobile computing device 14 and/or storage medium 16 without first obtaining identity information 24 from NFC tag 20. Identity information 24 can be used as a map to give mobile computing device 14 the location where the configuration information is stored.

In a typical installation, BAS controllers 12 are delivered to the installation location and installed (e.g., physically installed) prior to completion of electrical and other building subsystems. As such, BAS controller 12, including NFC tag 20, can be transported to the delivery location and installed while BAS controller 12 is in a powered-off state (i.e., not electrically powered). Rather than require that the determination of configuration information and other associated commissioning activities wait until electrical power is available and delivered to BAS controller 12, techniques of this disclosure enable the configuration information (e.g., wiring diagram 26, cables tags 28, manual instruction 29, and floorplan 30) to be determined and stored in NFC memory 22 while BAS controller 12 is in the powered-off state.

For instance, as is further described below, a service engineer or other technician can utilize mobile computing device 14 to retrieve and store the configuration information in NFC memory 22 while BAS controller 12 is in the powered-off state (e.g., installed at the final destination and in the powered-off state). For example, mobile computing device 14, when within range for NFC communications (e.g., when placed within range for NFC communications by the service engineer), can retrieve identity information 24 via NFC read operations initiated by a NFC transceiver of mobile computing device 14. Identity information 24 is then utilized to access/retrieve the configuration information (e.g., wiring diagram 26, cable tags 28, manual instruction 29, and/or floorplan 30). The configuration information can be stored in a variety of locations, including in NFC memory 22, memory in mobile computing device 14 (as explained with regards to FIG. 2), and/or in storage medium 16 that is remote from NFC tag 20 and mobile computing device 14. In examples where NFC memory 22 stores the configuration information, mobile computing device 14 can retrieve the configuration information via the NFC read operations for display and/or modification by the service engineer or other technician. In examples where the configuration information is stored in the memory of mobile computing device 14 and/or separate storage medium 16, mobile computing device 14 utilizes identity information 24 to get access to and retrieve the configuration information for display and/or modification/revision.

The configuration information as described herein includes wiring diagram 26, cable tags 28, manual instruction 29, and/or floorplan 30. Wiring diagram 26 is a schematic (e.g., visual representation) that shows the physical connections and physical layout of wires/cables that are to be connected to BAS controller 12. Service engineers and/or technicians utilize wiring diagram 26 as a blueprint for instruction as to how to connect the wires/cables to the ports of BAS controller 12. Wiring diagram 26 shows how the wires/cables are interconnected and can show where fixtures and components may be connected to BAS controller 12. Cable tags 28 are labels affixed to the wires/cables connected to BAS controller 12. To achieve certification of BAS 11, the wires/cables need to be labeled with cable tags 28 so that service engineers, technicians, and others can determine what the wire/cable is and whether it is connected to BAS controller 12 correctly. Manual instruction 29 can be instructions for guiding and/or troubleshooting a connection of wires/cables to BAS controller 12 by service engineers and/or technicians. Manual instruction 29 can include voice-based instruction that can respond to text-based and/or audible questions with text-based instruction and/or audio instruction. Manual instruction 29 can have other capabilities to aid service engineers and/or technicians in the connection and labeling of wires/cables. Floorplan 30 can be a blueprint of BAS 11 or the entire building (or group of buildings) within which BAS 11 is located. It should be noted that when discussing wiring diagram 26, cable tags 28, manual instruction 29, and floorplan 30 as being stored in NFC memory 22, in mobile computing device 14, and/or in storage medium 16, they are stored as electronic (e.g., digital) files and not as hardcopy printouts of the corresponding files. For example, cable tags 28 are stored as a digital file that includes a list of tags formatted in such a way that, when printed out by printer 18, the physical cable tags can easily be affixed to the cables. While the configuration information is described herein as being wiring diagram 26, cable tags 28, manual instruction 29, and/or floorplan 30, the configuration information can include other information relating to BAS controller 12.

If the configuration information (e.g., wiring diagram 26, cable tags 28, manual instruction 29, and/or floorplan 30) are stored in NFC memory 22, then identity information 24 may not be needed by mobile computing device 14 to allow for access and retrieval of the configuration information. Rather, login information entered into mobile computing device 14 (e.g., a login username and password) by a service engineer and/or technician can provide the requisite security clearance to allow access to the configuration information without the need for identity information 24, which can be utilized as a reference number to ensure mobile computing device 14 has authority to access the configuration information and aid in locating the configuration information from a location outside NFC memory 22. Because the configuration information does not need to be located in mobile computing device 14 or a separate storage medium when the configuration information is stored in NFC memory 22, no identity information 24 may be needed and mobile computing device 14 can retrieve the configuration information without further authorization.

Mobile computing device 14, after retrieving the configuration information, can display the configuration information on a display, such as a screen of a laptop computer, tablet computer, smartphone, etc. Mobile computing device 14 can allow for the service engineer and/or technician to revise the configuration information and store the revised configuration information being identified by the previous identity information 24 (e.g., overwrite the previous identity information) or under new identity information 24 that allows access/retrieval of the configuration information. Utilizing NFC read and write operations, mobile computing device 14 can then transmit and store the new identity information 24 associated with the revised configuration information in NFC memory 22. If the configuration information is stored in NFC memory 22, mobile computing device 14 can transmit and store the configuration information on NFC tag 20. Such operations allow for later retrieval of the revised configuration information.

As described above, identity information 24 can be utilized to access/retrieve the configuration information from storage medium 16, which is remote and separate from NFC tag 20 and mobile computing device 14. For example, storage medium 16 can be a cloud-based data storage facility, such as a server remote from BAS 11. When the configuration information is stored in storage medium 16, mobile computing device 14 is in communication with storage medium 16 and can retrieve the configuration information via either wired or wireless communication.

Printer 18 can be a mobile or stationary printer in communication with or incorporated into mobile computing device 14. Printer 18 is configured to print out a portion or the entirety of any one of wiring diagram 26, cable tags 28, manual instruction 29, and floorplan 30. Mobile computing device 14 can be configured such that, after retrieval of the configuration information, the configuration information is automatically transmitted to printer 18 and printer 18 then automatically prints the configuration information. For example, mobile computing device 14 can retrieve cable tags 28 (as a digital file), transmit the digital file of cable tags 28 to printer 18, and printer 18 can then print a physical version of cable tags 28. The physical cable tags 28 are then affixed to the corresponding cables/wires of BAS controller 12. Printer 18 can be configured to print the configuration information in any format, such as printing cable tags 28 as a series of adhesive strips/labels.

Figure 2:
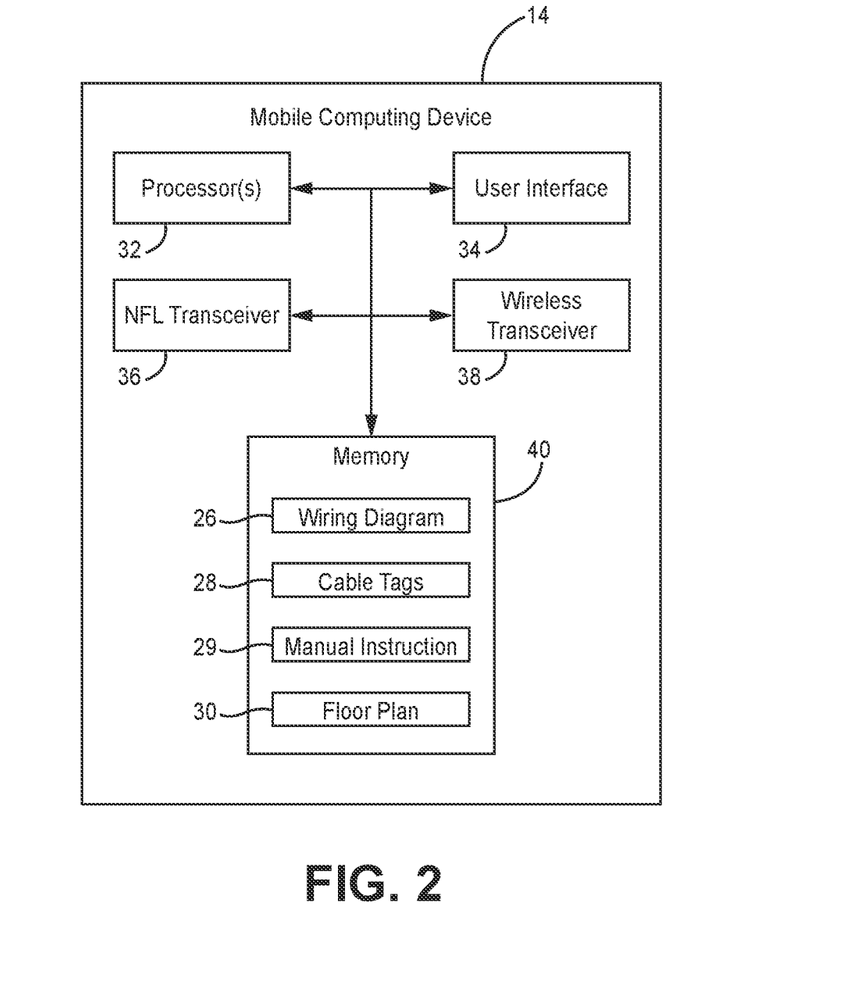
FIG. 2 is a block diagram illustrating further details of the computing device of FIG. 1

FIG. 2 is a block diagram illustrating further details of computing device 14 of FIG. 1, which can be a laptop computer, a tablet computer, a smartphone, or other mobile computing device capable of communicating via NFC read and write operations with NFC memory 22 of NFC tag 20 associated with BAS controller 12 (FIG. 1). As illustrated in FIG. 2, computing device 14 can include one or more processors 32, user interface 34, NFC transceiver 36, wireless transceiver 38, and computer-readable memory 40. Computer-readable memory 40 can store the configuration information, which can include wiring diagram 26, cable tags 28, manual instruction 29, and/or floorplan 30.

Processor 32 can be configured to implement functionality and/or process instructions for execution within computing device 14. For instance, processor 32 can be capable of processing instructions stored in computer-readable memory 40, such as computer-readable instructions associated herein with wiring diagram 26, cable tags 28, manual instruction 29, and floorplan 30 (collectively, the configuration information). Examples of processor 32 can include any one or more of a microprocessor, a digital signal processor (DSP), an application specific integrated circuit (ASIC), a field-programmable gate array (FPGA), or other equivalent discrete or integrated logic circuitry.

Mobile computing device 14 utilizes user interface 34 for receiving input from and outputting information to a user, such as a service engineer, technician, and/or other user. User interface 34 can include physical and/or graphical control elements that enable user input to interact with computing device 14. For instance, user interface 34 can take the form of a graphical user interface (GUI) that presents graphical control elements at, for example, a display device of user interface 34. In certain examples, computing device 14 can present the GUI at a touch-sensitive and/or presence sensitive display screen to receive user input in the form of gestures, such as touch gestures, scroll gestures, zoom gestures or other gesture input. In certain examples, user interface 34 can include a physical keyboard, a mouse, physical buttons, keys, knobs, or other physical control elements configured to receive user input to interact with mobile computing device 14. User interface 34 is configured to display and allow for the revision of wiring diagram 26, cable tags 28, manual instruction 29, and floorplan 30. In the case of manual instruction 29, inter interface 34 can be configured to play audio instructions and allow for audio, visual, and other interactions with manual instruction 29.

Mobile computing device 14 utilizes NFC transceiver 36 for communicating with one or more remote NFC transceivers and/or NFC tags, such as NFC tag 20 (FIG. 1). As is further described below, mobile computing device 14 can utilize NFC transceiver 36 for retrieving information from and storing information in NFC memory 22 (FIG. 1) via NFC read and write operations.

Mobile computing device 14 can also utilize wireless transceiver 38 for communing with storage medium 16 and/or printer 18. Wireless transceiver 38 can be utilized for retrieving the configuration information from storage medium 16 (possibly through the use of identity information 24) and/or transmitting the configuration information to printer 18 to be printed. Wireless transceiver 38 can also be utilized to send and receive information regarding the verification of login information to ensure that mobile computing device 14 has authority to access the configuration information. While described herein as having wireless capabilities, wireless transceiver 38 can communicate with storage medium 16 and printer 18 via other communications, such as a wired connection. For example, printer 18 can be incorporated into mobile computing device 14 such that communication with printer 18 is wired. Additionally, wireless transceiver 38 can be incorporated into NFC transceiver 36 such that the two are one element.

Computer-readable memory 40 can be configured to store information within mobile computing device 14 during operation. In some examples, computer-readable memory 40 can include non-transitory memory. The term "non-transitory" can indicate that the storage medium is not embodied in a carrier wave or a propagated signal. In certain examples, non-transitory memory can store data that can, over time, change (e.g., in RAM or cache).

In some examples, computer-readable memory 40 can include volatile memory elements that do not maintain stored contents when electrical power to mobile computing device 14 is removed. Examples of volatile memory elements can include random access memories (RAM), dynamic random access memories (DRAM), static random access memories (SRAM), and other forms of volatile memories. In certain examples, computer-readable memory 40 can include non-volatile memory elements configured for long-term storage of information. Examples of such non-volatile memory elements can include, for example, magnetic hard discs, optical discs, flash memories, or forms of electrically programmable memories (EPROM) or electrically erasable and programmable (EEPROM) memories.

As illustrated in FIG. 2, computer-readable memory 40 can store the electronic (e.g., digital) file(s) that include wiring diagram 26, cable tags 28, manual instruction 29, and/or floorplan 30 (collectively, the configuration information). The configuration information can take the form of computer-readable instructions that, when executed by processor 32, cause computing device 14 to implement functionality for, example, the display of the configuration information. In general, computer-readable memory 40 can store computer-readable instructions that, when executed by processor 40, cause computing device 14 to operate in accordance with techniques described herein.

For example, mobile computing device 14 can execute steps to cause NFC transceiver 36 to retrieve identity information 24 and the configuration information from NFC memory 18 via NFC read operations. Computing device 14 can further execute instructions to verify login information input by a user to ensure mobile computing device 14 has authority to access the configuration information. As described above, computer-readable memory 40 can store the configuration information such that the configuration information is retrieved from computer-readable memory 40 within mobile computing device 14 and does not require retrieval of the configuration information from NFC tag 20 or storage medium 16. The configuration information can be stored in computer-readable memory 40 under identity information 24 such that identity information 24 shows the location and allows access to the configuration information. Mobile computing device 14 can allow a user to revise the configuration information (i.e., wiring diagram 26, cable tags 28, manual instruction 29, and floorplan 30). The revised configuration information can then be stored in computer-readable memory 40 under a new identity information 24 or under the old identity information 24 (i.e., overwrite the previous configuration information). The new identity information 24 is then transmitted to NFC tag 20 via NFC read and write operations such that the new identity information 24 is utilized for lateral retrieval of the revised configuration information.

Figure 3:
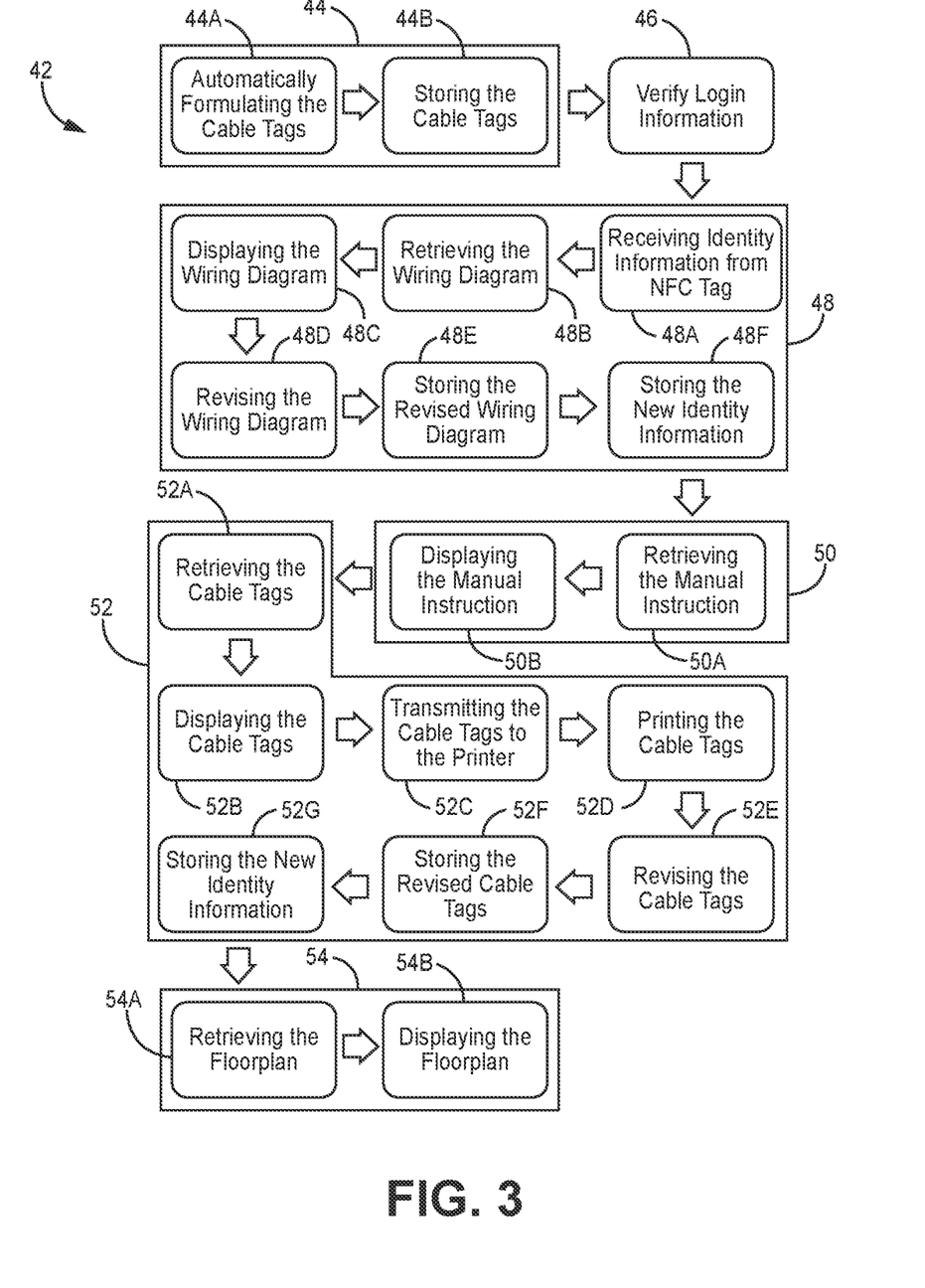
FIG. 3 is a flow diagram illustrating an example method for retrieving the configuration information.

FIG. 3 is a flow diagram illustrating an example method for retrieving and revising the configuration information. Method 42 can include six sets of steps that can each include multiple substeps. Method 42 includes generating cable tags steps 44, verifying login information 46, wiring diagram steps 48, manual instruction steps 50, retrieving cable tags steps 52, and floorplan steps 54. Method 42 disclosed herein can include additional steps to those described below or can include only one or a subset of steps set out below. Thus, method 42 is not exclusive and can be added to, subtracted from, or otherwise modified depending on the configuration information intending to be retrieved, revised, printed, etc.

Method 42 can include the generating cable tags steps 44, which includes automatically formulating cable tags 44A and storing the cable tags 44B. The entirety of the BAS can be designed and displayed in a controller program, such as an AutoCAD file or another common design program. The program/design can include the information utilized to create the wiring diagram and the cable tags, so the digital file of the cable tags can be formulated from the controller program. The information that will be utilized to create the cable tags can be flagged or otherwise denoted/titled such that, when instructed or when the information comprising the cable tags is complete, the controller program can automatically formulate the cable tags 44A. After formulating the cable tags 44A, the cable tags are stored 44B. The cable tags can be stored in a variety of electronic (e.g., digital) storage media, including in the memory of the NFC tag, in the memory of the mobile computing device, or in a storage medium remote from the NFC tag and the mobile computing device (such as cloud storage). The controller program can automatically upload/transmit the cable tags to the stored media via wired and/or wireless communication, can transmit via NFC read and write operations, and/or can store the cable tags through other means for later retrieval by the mobile computing device.

Method 42 can also include the step of verifying login information 46. Verifying login information 46 ensures that the user of the mobile computing device, such as the service engineer or technician, has the proper authority to access the configuration information and prevents an unauthorized user from viewing and/or revising the configuration information. Verifying login information 46 can include verifying a username and password inputted into the mobile computing device, utilizing a virtual private network (VPN) on the mobile computing device, or another security protocol.

Method 42 can include wiring diagram steps 48, which can include multiple substeps. First, the mobile computing device receives the identity information 48A from the memory of the NFC tag via NFC read operations. As described above, the identity information can provide location details for the configuration information, which can be stored on the NFC tag, on the mobile computing device, and/or in the storage medium. Step 48A may not be necessary if the configuration information is stored in the memory of the NFC tag because location details would not be needed to locate the configuration information: the configuration information is easily found on the NFC tag.

Next, the mobile computing device retrieves the wiring diagram 48B from a storage medium, which can be the memory of the NFC tag, the memory of the mobile computing device, and/or a storage medium remote from the NFC tag and the mobile computing device. The retrieval of the wiring diagram 48B can be dependent upon the identity information such that the identity information provides location information to the mobile computing device regarding the location of the wiring diagram.

Then, the wiring diagram is displayed 48C for viewing by a user of the mobile computing device, such as a service engineer or technician. The display of the wiring diagram 48C can be on a screen of the mobile computing device or can be by other manner. For example, the mobile computing device can instruct the printer to print a hardcopy of the wiring diagram, and then the hardcopy of the wiring diagram can be viewed.

The wiring diagram can be revised 48D depending on the connection pattern and/or identity of cables/wires being connected to the BAS controller by a user/service engineer/technician via the mobile computing device. During the wiring of the BAS controller, the service engineer or technician may deviate from the wiring diagram. In such instances, the wiring diagram can be revised 48D to reflect the actual wiring (e.g., identity of cables/wires and/or connection pattern) of the BAS controller.

After revising the wiring diagram 48D, the revised wiring diagram is stored 48E. The revised wiring diagram can be stored in the memory of the NFC tag, in the memory of the mobile computing device, and/or in a separate storage medium. The storage of the revised wiring diagram 48E can include overwriting the previous wiring diagram or storing a new file with the revised wiring diagram.

If the revised wiring diagram is being stored in the mobile computing device and/or in the separate storage medium, the step of storing new identity information 48F in the memory of the NFC tag for later retrieval operations may need to be performed. The new identity information can provide the location at which the revised wiring diagram is stored. If the revised wiring diagram is stored at the location of the previous identity information (and thus the previous wiring diagram has been overwritten), then step 48F may not need to be performed as the identity information would already have the location details of the wiring diagram. Additionally, if the revised wiring diagram is stored in the memory of the NFC tag, then step 48F may not need to be performed as a location of the revised wiring diagram is easily found and the identity information is not needed.

Method 42 can include manual instruction steps 50, which can include retrieving the manual instruction 50A and displaying the manual instruction 50B. Retrieving the manual instruction 50A can be performed by the mobile computing device, and the manual instruction can be stored in any of the storage media described above. Retrieving the manual instruction 50A can be similar to the process of retrieving the wiring diagram 48B.

Next, the manual instruction is displayed 50B. The display of the manual instruction can include visually displaying text, schematics, or other instructions. Additionally, the display of the manual instruction can include audibly playing instructions via a speaker associated with or in communication with the mobile computing device. Other embodiments can include voice-based instruction that can respond to text-based and/or audible questions by displaying visual (e.g., text-based) instruction and/or audio instruction. Method 42 may not include substeps 50A and 50B if the configuration information does not include a manual instruction and/or if the service engineers and/or technicians do not need a manual instruction to install the BAS controller. Additionally, the manual instruction steps 50 can include additional steps similar to steps 48D-48F regarding the wiring diagram (e.g., revising the manual instruction, storing the revised manual instruction, and storing the new identity information).

The retrieving cable tags steps 52 are similar to the wiring diagram steps 48. If not yet performed, the substep 48A (the mobile computing device receives the identity information from the memory of the NFC tag via NFC read operations) is performed. Then, the mobile computing device retrieves the cable tags 52A from a storage medium, which can be the memory of the NFC tag, the memory of the mobile computing device, and/or a storage medium remote from the NFC tag and the mobile computing device. The retrieval of the cable tags 52A can be dependent upon the identity information such that the identity information provides location information to the mobile computing device regarding the location of the cable tags file.

Next, the cable tags are displayed 52B for viewing by a user of the mobile computing device, such as a service engineer or technician. The display of the cable tags 52B can be on a screen of the mobile computing device or can be by other manner. Other processes of method 42 can include steps in which the cable tags are not displayed 52B and instead sent to the printer to be printed and viewed as a hardcopy.

The cable tags can be transmitted to the printer 52C by the mobile computing device via wired or wireless communication. As described above, the printer can be a separate component from the mobile computing device or can be incorporated into the mobile computing device. Step 52C can be performed automatically by the mobile computing device after retrieving the cable tags 52A, or the cable tags can be transmitted to the printer 52C in response to instructions from the user of the mobile computing device.

After transmitting the digital file of the cable tags to the printer 52C, the printer prints hardcopies of the cable tags 52D. The physical hardcopies of the cable tags can then be affixed to the corresponding cables/wires of the BAS controller by the service engineer and/or technician. The cable tags 52D can be printed in a variety of configurations/formats, such as printing the cable tags as a series of adhesive strips/labels for easier affixing to the cables/wires.

Similar to step 48D with regards to the wiring diagram, the digital file of the cable tags can be revised 52E depending on the cables/wires being connected to the BAS controller by a user/service engineer/technician via the mobile computing device. During the wiring and/or labeling of the BAS controller, the service engineer or technician may deviate from the wiring diagram (or the designed labeling of the cables). In such instances, the cable tags can be revised 52E to reflect the actual wiring and labeling of the BAS controller cables. The revised cable tags can then be transmitted to the printer and printed (thus, repeating steps 52C and 52D if necessary).

After revising the cable tags 52E, the revised cable tags are stored 52F. The revised cable tags can be stored in the memory of the NFC tag, in the memory of the mobile computing device, and/or in a separate storage medium. The storage of the revised cable tags 52F can include overwriting the previous cable tags or storing a new file with the revised cable tags.

If the revised cable tags are being stored in the mobile computing device and/or in the separate storage medium, the step of storing new identity information 52G in the memory of the NFC tag for later retrieval operations is performed. The new identity information can provide the location at which the revised cable tags are stored. If the revised cable tags are stored at the location of the previous identity information (and thus the previous cable tags have been overwritten), then step 52G performed as the identity information would already have the location details of the cable tags. Additionally, if the revised cable tags are stored in the memory of the NFC tag, then step 52G may not need to be performed as a location of the revised cable tags are easily found and the identity information is not needed.

Method 42 can also include floorplan steps 54, which can include retrieving the floorplan 54A and displaying the floorplan 54B. Retrieving the floorplan 54A can be performed by the mobile computing device, and the floorplan can be stored in any of the storage media described above. Retrieving the floorplan 54A can be similar to the process of retrieving the wiring diagram 48B. As with the other files/information of the configuration information, the retrieval of the floorplan 54A can be dependent upon the identity information such that the identity information tells the mobile computing device where the floorplan is located.

Next, the floorplan is displayed 54B for viewing by a user of the mobile computing device, such as a service engineer or technician. The display of the floorplan 54B can be on a screen of the mobile computing device or can be by other manner. For example, the mobile computing device can instruct the printer to print a hardcopy of the floorplan, and then the hardcopy of the floorplan can be viewed. Additionally, the floorplan steps 54 can include additional steps similar to steps 48D-48F regarding the wiring diagram (e.g., revising the floorplan, storing the revised floorplan, and storing the new identity information).

System 10 and method 42 described herein provide for secure and reliable NFC communications between mobile computing device 14 and BAS controller 12, as well as the ability to verify that mobile computing device 14 has the authority to access the configuration information based on identity information 24 that is stored in NFC memory 22 of NFC tag 20. Moreover, the use of passive NFC technologies enables the identity and configuration information to be determined and stored in NFC memory 22 of NFC tag 20 while BAS controller 12 is in a powered-off state, thereby increasing flexibility of scheduling for commissioning/installation operations associated with BAS controller 12. With the configuration information including wiring diagram 26 for instruction on connecting cables to BAS controller 12 and cable tags 28 for labeling the cables that are being connected to BAS controller 12, only one service engineer/technician is needed to perform both the wiring and tagging, therefore decreasing the time and corresponding cost associated with configuring and commissioning/installing of BAS controllers 12. Further, mobile computing device 14 allows for revisions to wiring diagram 26 and cable tags 28 (and other configuration information, such as manual instruction 29 and floorplan 30). Mobile computing device 14 allows for storage of the revised wiring diagram 26 and/or cable tags 28 on any of the storage media with the revised wiring diagram 26 and/or cable tags 28 being retrievable by being identified with the previous identity information 24 or new, updated identity information 24 stored in NFC memory 22 of NFC tag 20.

Discussion of Possible Embodiments

The following are non-exclusive descriptions of possible embodiments of the present invention.

In one example, a process for retrieving configuration information for a controller of a building automation system (BAS) includes verifying login information on a mobile computing device to ensure the mobile computing device has authority to access a wiring diagram. Then, a mobile computing device receives identity information associated with the controller via Near Field Communication (NFC) read operations from memory of an NFC tag associated with the controller and retrieves, using the identity information, the wiring diagram from a storage medium. The mobile computing device further displays the retrieved wiring diagram associated with the controller.

The method of the preceding paragraph can optionally include, additionally and/or alternatively, any one or more of the following features, configurations, operations, steps, and/or additional components:

The identity information includes at least one of: a media access control (MAC) address, a model type of the controller, an internet protocol (IP) address, a building automation control network (BACnet) MAC address, a hardware address, a vendor identification number, a device identification number, a serial number of the controller, a serial number of the NFC tag, and a device location.

The step of retrieving the wiring diagram from the storage medium further comprises retrieving the wiring diagram from the storage medium that is remote from and in communication with the mobile computing device such that the wiring diagram is not stored on the mobile computing device.

The step of retrieving the wiring diagram from the storage medium further comprises retrieving the wiring diagram from memory of the mobile computing device such that the wiring diagram is stored on the mobile computing device.

The step of retrieving the wiring diagram from the storage medium further comprises retrieving the wiring diagram from memory of the NFC tag such that the wiring diagram is stored on the NFC tag.

The login information includes a username and a password provided to a user interface of the mobile computing device.

The method further comprises retrieving, by the mobile computing device from the storage medium, a manual instruction associated with the controller.

The method further comprises displaying, by the mobile computing device, the retrieved manual instruction associated with the controller.

The manual instruction includes a voice-based instruction for guiding and troubleshooting a connection of cables to the controller.

The method further comprises retrieving, by the mobile computing device using the identity information, cable tags associated with cables configured to be connected to the controller, wherein retrieving the identity information comprises retrieving the identity information from the storage medium.

The method further comprises displaying, by the mobile computing device, the retrieved cable tags associated with the controller.

The method further comprises transmitting, by the mobile computing device, the cable tags to a printer in response to retrieving the cable tags and printing, by the printer, the cable tags.

The method further comprises revising the cable tags; storing, by the mobile computing device, the revised cable tags with new identity information associated with the controller; and storing the new identity information in the memory of the NFC tag for later retrieval operations by the controller.

The method further comprises automatically formulating, from a controller program, the cable tags and storing the cable tags in the storage medium for later retrieval operations by the mobile computing device.

The method further comprises revising the wiring diagram.

The method further comprises storing, by the mobile computing device, the revised wiring diagram with new identity information associated with the controller and storing the new identity information in the memory of the NFC tag for later retrieval operations by the controller.

The method further comprises storing the revised wiring diagram in the memory of the NFC tag.

The method further comprises retrieving, by the mobile computing device using the identity information, a floorplan associated with a building within which the controller is located, wherein retrieving the floorplan comprises retrieving the floorplan from the storage medium and displaying, by the mobile computing device, the retrieved floorplan.

In another example, a system for retrieving configuration information for a controller includes a Near Field Communication (NFC) tag including NFC memory that stores identity information corresponding to the controller; a storage medium configured to store electronic (i.e., digital) data; and a mobile computing device that includes an NFC transceiver and is configured to receive the identity information from the NFC tag and retrieve a wiring diagram associated with the controller from the storage medium.

The system of the preceding paragraph can optionally include, additionally and/or alternatively, any one or more of the following features, configurations, operations, steps, and/or additional components:

The mobile computing device is further configured to retrieve cable tags associated with cables to be connected to the controller from the storage medium and transmit the cable tags to a printer.

The system further comprises the printer being configured to automatically print the cable tags in response to the mobile computing device retrieving the cable tags and transmitting the cable tags to the printer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for retrieving configuration information for a controller, the method comprising:
    verifying login information on a mobile computing device to ensure the mobile computing device has authority to access a wiring diagram;
    receiving, by the mobile computing device, identity information associated with the controller via Near Field Communication (NFC) read operations from memory of an NFC tag associated with the controller, which is one of a plurality of controllers in a building automation system, wherein the controller is in installed in a final destination and is in a powered-off state;
    retrieving, by the mobile computing device using the identity information, the wiring diagram from a storage medium; and
    displaying, by the mobile computing device, the retrieved wiring diagram associated with the controller.

2. The method of claim 1, wherein the mobile computing device is physically remote from the controller.

3. The method of claim 1, wherein the step of retrieving the wiring diagram from the storage medium further comprises:
    retrieving the wiring diagram from memory of the NFC tag such that the wiring diagram is stored on the NFC tag.

4. The method of claim 1, wherein the login information includes a username and a password provided to a user interface of the mobile computing device.

5. The method of claim 1, further comprising:
    retrieving, by the mobile computing device from the storage medium, a manual instruction associated with the controller.

6. The method of claim 5, further comprising:
    displaying, by the mobile computing device, the retrieved manual instruction associated with the controller.

7. The method of claim 5, wherein the manual instruction includes a voice-based instruction for guiding and troubleshooting a connection of cables to the controller.

8. The method of claim 1, further comprising:
    retrieving, by the mobile computing device using the identity information, cable tags associated with cables configured to be connected to the controller, wherein retrieving the identity information comprises retrieving the identity information from the storage medium.

9. The method of claim 8, further comprising:
    displaying, by the mobile computing device, the retrieved cable tags associated with the controller.

10. The method of claim 8, further comprising:
    transmitting, by the mobile computing device, the cable tags to a printer in response to retrieving the cable tags; and
    printing, by the printer, the cable tags.

11. The method of claim 8, further comprising:
revising the cable tags;
storing, by the mobile computing device, the revised cable tags with new identity information associated with the controller; and
storing the new identity information in the memory of the NFC tag for later retrieval operations by the controller.

12. The method of claim 8, further comprising:
automatically formulating, from a controller program, the cable tags; and
storing the cable tags in the storage medium for later retrieval operations by the mobile computing device.

13. The method of claim 1, further comprising:
revising the wiring diagram.

14. The method of claim 13, further comprises:
storing, by the mobile computing device, the revised wiring diagram with new identity information associated with the controller; and
storing the new identity information in the memory of the NFC tag for later retrieval operations by the controller.

15. The method of claim 13 further comprises:
storing the revised wiring diagram in the memory of the NFC tag.

16. The method of claim 1, further comprising:
retrieving, by the mobile computing device using the identity information, a floorplan associated with a building within which the controller is located, wherein retrieving the floorplan comprises retrieving the floorplan from the storage medium; and
displaying, by the mobile computing device, the retrieved floorplan.

17. A system for retrieving configuration information for a controller, the system comprising: a Near Field Communication (NFC) tag including NFC memory that stores identity information corresponding to the controller, which is one of a plurality of controllers in a building automation system; a storage medium configured to store digital data; and a mobile computing device that includes an NFC transceiver and is configured to receive the identity information from the NFC tag and retrieve a wiring diagram associated with the controller from the storage medium while the controller is in installed in a final destination and is in a powered-off state.

18. The system of claim 17, wherein the mobile computing device is further configured to receive the identity information from the NFC tag while the mobile computing device is physically remote from the controller.

19. The system of claim 17, wherein the mobile computing device is further configured to retrieve cable tags associated with cables to be connected to the controller from the storage medium and transmit the cable tags to a printer, and the system further comprises:
the printer being configured to automatically print the cable tags in response to the mobile computing device retrieving the cable tags and transmitting the cable tags to the printer.

20. A system for retrieving configuration information for a controller, the system comprising:
a Near Field Communication (NFC) tag including NFC memory that stores identity information corresponding to the controller, which is one of a plurality of controllers in a building automation system;
a storage medium configured to store digital data; and
a mobile computing device that includes an NFC transceiver and is configured to:
verify login information to ensure the mobile computing device has authority to access a wiring diagram;
receive the identity information from the NFC tag and retrieve a wiring diagram associated with the controller from the storage medium while the controller is installed in a final destination and is in a powered-off state; and
display the retrieved wiring diagram associated with the controller.

21. The system of claim 20, wherein the mobile computing device is further configured to receive the identity information from the NFC tag while the mobile computing device is physically remote from the controller.

\* \* \* \* \*